(12) United States Patent
Hubbell et al.

(10) Patent No.: US 9,067,245 B2
(45) Date of Patent: Jun. 30, 2015

(54) WASTE COLLECTION SYSTEM

(71) Applicants: Gerald Hubbell, Belleair, FL (US);
James Hughes, St. Petersburg, FL (US)

(72) Inventors: Gerald Hubbell, Belleair, FL (US);
James Hughes, St. Petersburg, FL (US)

( * ) Notice: Subject to any disclaimer, the term of this patent is extended or adjusted under 35 U.S.C. 154(b) by 0 days.

(21) Appl. No.: 13/999,533

(22) Filed: Mar. 7, 2014

(65) Prior Publication Data

US 2014/0305851 A1    Oct. 16, 2014

Related U.S. Application Data

(60) Provisional application No. 61/851,501, filed on Mar. 8, 2013.

(51) Int. Cl.
*B07C 5/00* (2006.01)
*B07C 5/34* (2006.01)

(52) U.S. Cl.
CPC ....... *B07C 5/3412* (2013.01); *B07C 2501/0054* (2013.01)

(58) Field of Classification Search
CPC ............... B07C 5/3412; B07C 2501/0054
USPC ......... 209/546, 552, 577, 583, 587, 630, 655, 209/702, 703, 707
See application file for complete search history.

(56) References Cited

U.S. PATENT DOCUMENTS

| | | | | |
|---|---|---|---|---|
| 4,373,435 A | * | 2/1983 | Grevich | 100/49 |
| 5,257,577 A | * | 11/1993 | Clark | 100/99 |
| 5,425,458 A | * | 6/1995 | Gilcreest et al. | 209/655 |
| 5,950,920 A | * | 9/1999 | Acosta | 232/43.1 |
| 6,588,330 B1 | * | 7/2003 | Importico | 100/98 R |

* cited by examiner

*Primary Examiner* — David H Bollinger
(74) *Attorney, Agent, or Firm* — Arthur W Fisher, III

(57) ABSTRACT

A waste collection system to identify and classify waste materials into a plurality of pre-established categories and then to sort into and collect the waste materials by the plurality of the pre-established categories for subsequent disposal comprising a cabinet to house a plurality of collection bins or containers corresponding to the plurality of pre-established categories of waste materials to receive and collect the waste materials by the corresponding pre-established category, a waste sorting assembly to selectively direct the waste materials into the collection bin or container corresponding to the particular category of waste material, a latch mechanism to selectively engage the waste sorting assembly to control access into the cabinet and a system control to identify and classify waste materials into one of the plurality of pre-established categories and to direct the categorized waste material into the appropriate or corresponding collection bin or container for subsequent disposal.

13 Claims, 12 Drawing Sheets

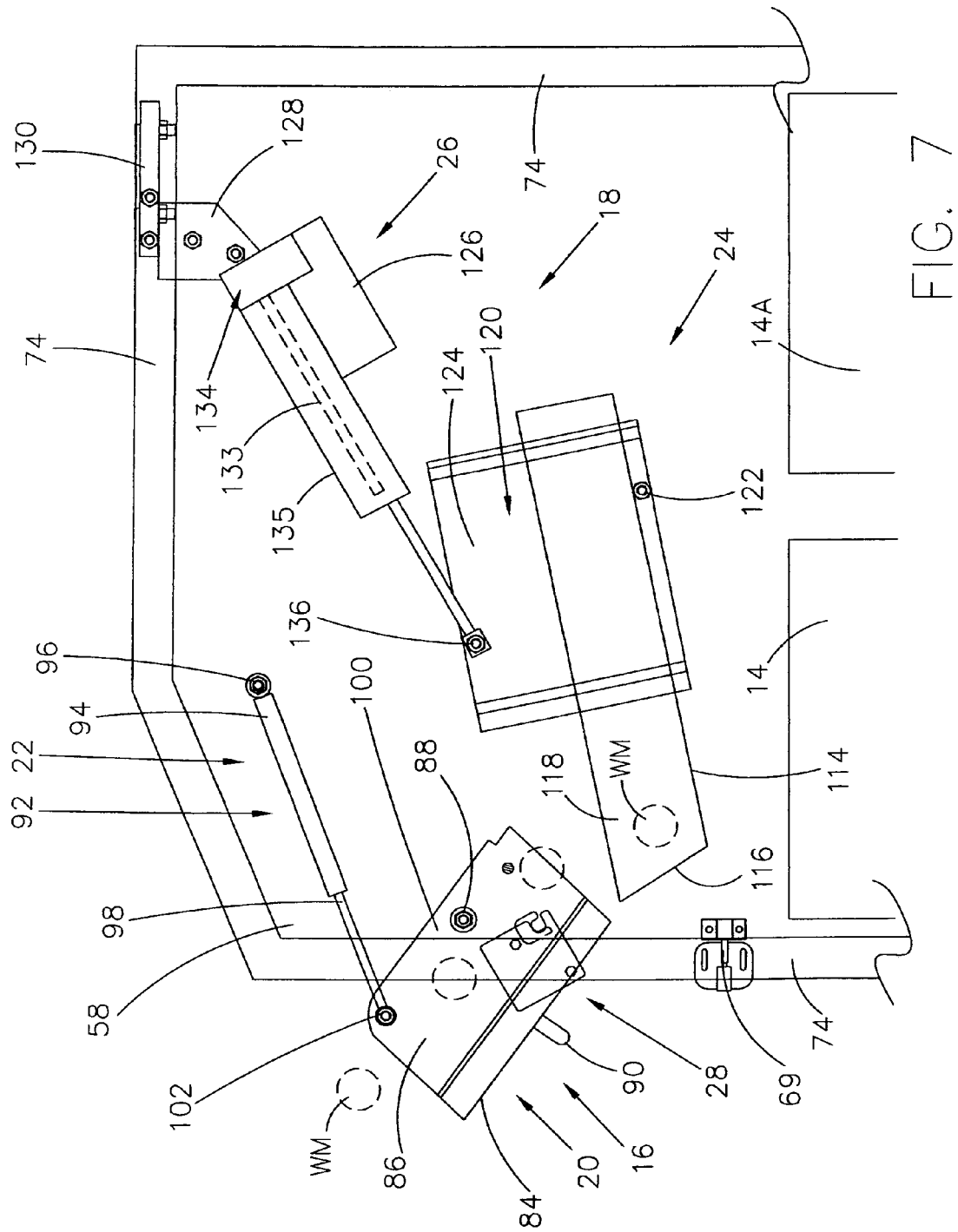

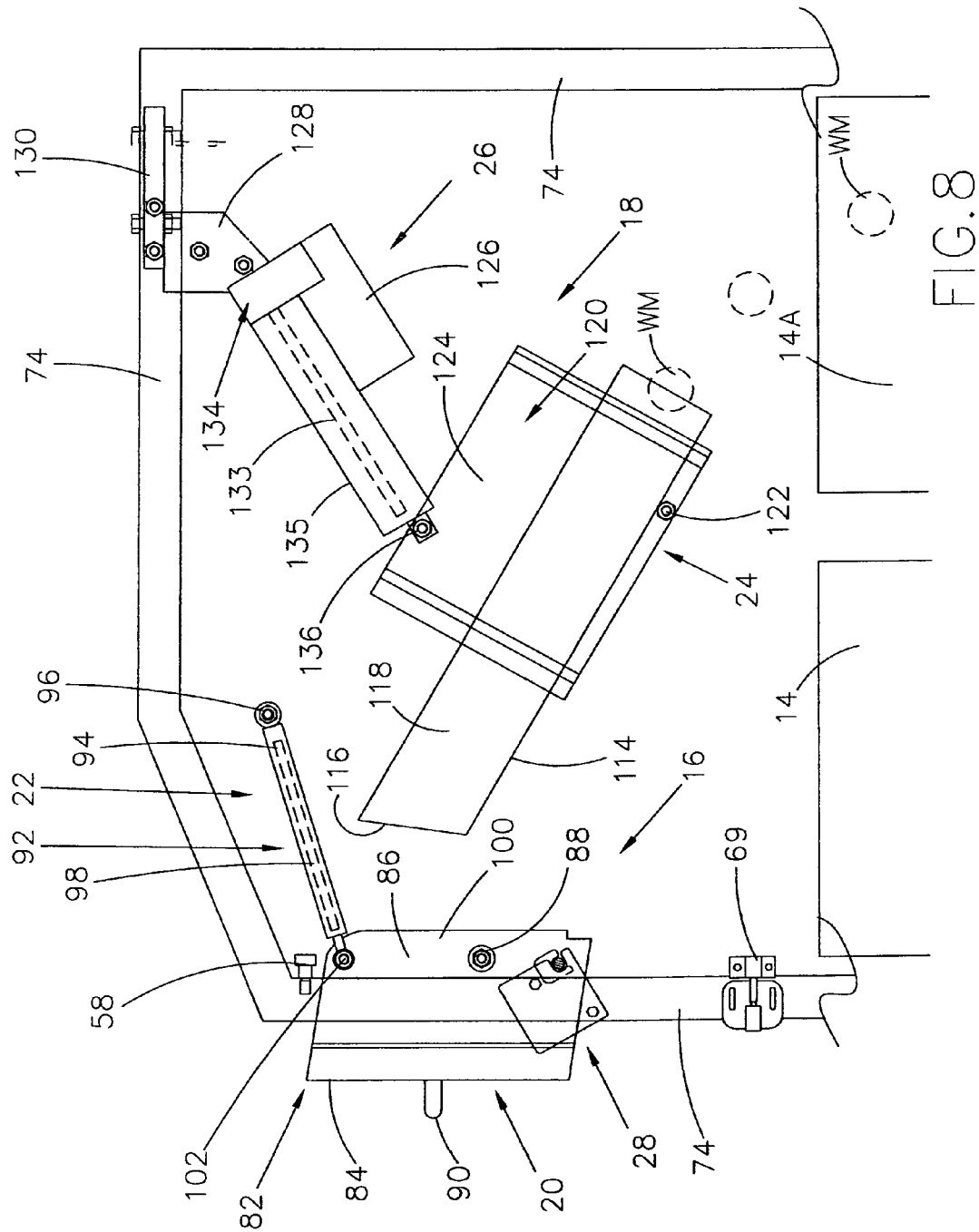

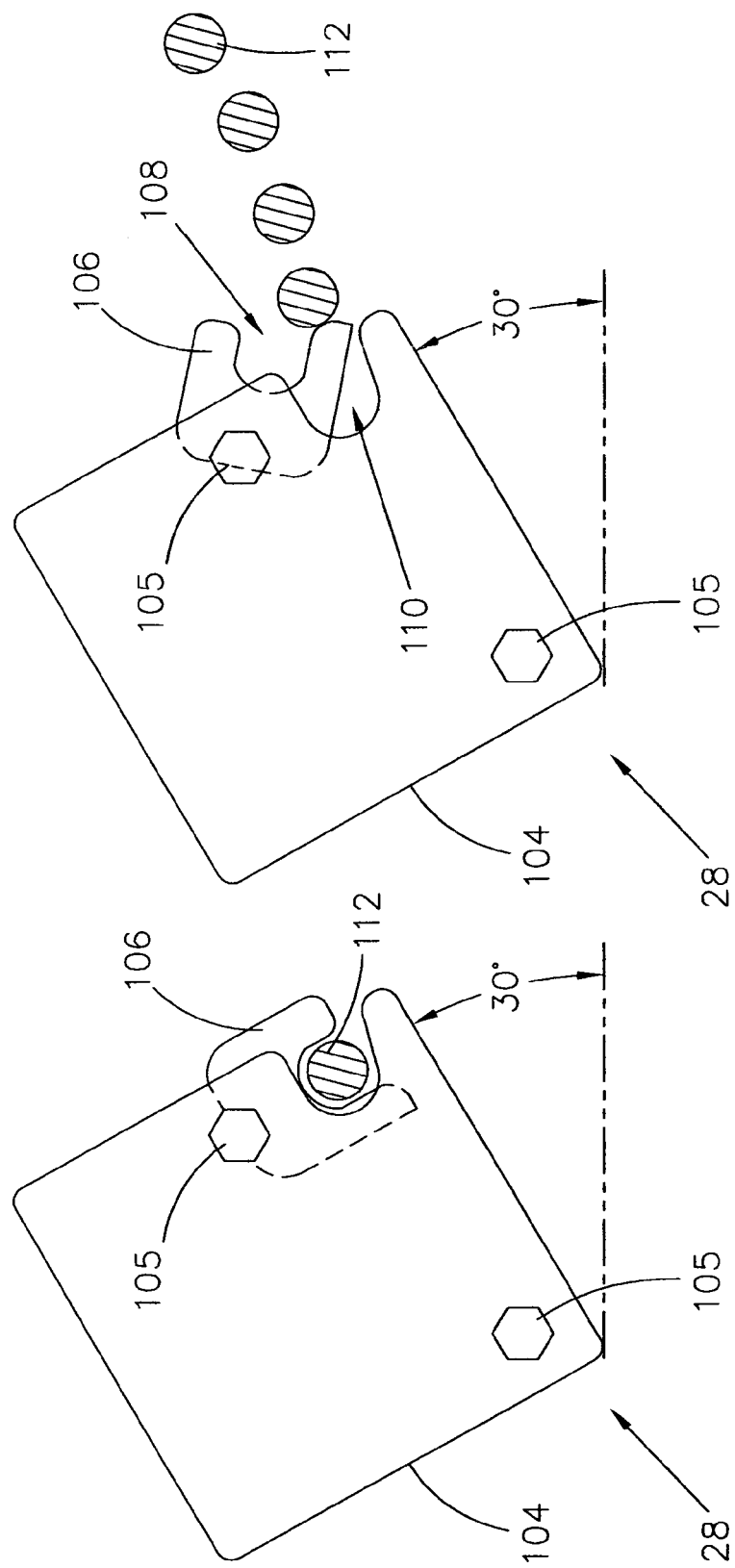

WASTE COLLECTION SYSTEM

CROSS-REFERENCE

This utility application claims priority from provisional patent application Ser. No. 61/851,501 filed Mar. 8, 2013.

BACKGROUND OF THE INVENTION

1. Field of the Invention

A waste collection system for identifying and classifying waste materials into a plurality of categories and then to sort into and collect the waste material by the pre-established categories for subsequent disposal.

2. Description of the Prior Art

The Resource Conservation & Recovery Act (RCRA) which was enacted in 1976 in order to control the disposal of harmful or hazardous waste materials that include many thousands of different drugs and medical waste material considered hazardous by RCRA requirements found in hospitals and other medical facilities. Thus there is an ever increasing need for hospitals and other medical facilities to audit compliance with the laws and implemented regulations as wall as industry guidelines. To economically and efficiently dispose of their hazardous materials there is a need to sort and separate hazardous materials that require special handling and disposal from nonhazardous materials.

Often medical personnel manually sort waste streams into different colored containers for proper disposal of the separate waste streams. It is always not clear which pharmaceuticals or waste materials are hazardous simply by looking at the container. Confusion can result in disposing materials such as sharps containers, infectious waste bags and drugs into non-hazardous pharmaceutical containers.

There have been efforts to mechanize the sorting and separating process. Several examples are discussed below.

U.S. Pat. No. 5,178,322 teaches a secure disposable container assembly for medical sharps and waste comprising a lower housing with a top having an upwardly extending rectangular opening for providing access to the housing and a top cover secured by locking tabs for permanent securement thereto. An access opening is fixed in the top for receiving materials that are dumped into the lower housing receptacle.

U.S. Pat. No. 4,702,385 discloses a disposable container assembly comprising an open top housing for receiving an inner disposable container having a lockable cap and a bracket assembly for permanent attachment to a stationary object in combination with a lock latching means for securing an outer container to the bracket and for lockably securing the inner container in a position inside the outer container.

U.S. Pat. No. 7,138,918 shows a system for disposing of medical waste configured to sort waste items into a plurality of disposable containers comprising sorting stations each of which houses a number of disposable containers.

While some of the prior art may contain some similarities relating to the present invention, none of them teach, suggest or include all of the advantages and unique features of the invention disclosed hereafter.

SUMMARY OF THE INVENTION

The present invention relates to a waste collection system to identify and classify waste materials into a plurality of pre-established categories and then to sort into and collect the waste materials by the plurality of the pre-established categories for subsequent remote disposal.

The waste system comprises a cabinet to house a plurality of collection bins or containers corresponding to the plurality of pre-established categories of waste materials to receive and collect the waste materials sorted into the corresponding pre-established category and a waste sorting assembly including a plurality of waste subassemblies corresponding to the plurality of pre-established categories of waste materials each including a directional chute movable between a first position and a second position by a corresponding chute positioning device to selectively direct the waste material into the appropriate collection bin or container corresponding to the particular waste material for subsequent disposal.

A latch mechanism is disposed to selectively engage one of the plurality of directional chutes to control access to the interior of the cabinet to permit waste materials to be deposited into the cabinet for sorting and collection into the appropriate collection bin or container.

A system control including a memory, microprocessor and scanner identifies and classifies waste material into one of the plurality of pre-established categories, controls the latch mechanism and actuates the appropriate chute positioning device or devices to position the appropriate directional chute or chutes to receive and direct the categorized waste material into the appropriate collection bin or container for subsequent disposal.

When used to sort and collect medical waste materials, the waste materials may be sorted into hazardous and nonhazardous materials. Further, by configuring the waste collection system with multiple cabinets controlled by the system control the pre-established categories of medical waste may include material returnable for credit, nonhazardous controlled material, nonhazardous noncontrolled material and hazardous material. Unidentified or unclassified waste material is defaulted as hazardous material.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 7 is a side view of the waste sorting assembly of the waste collection system of the present invention in the initial stage of the second sorting configuration.

FIG. 8 is a side view of the waste sorting assembly of the waste collection system of the present invention in the final stage the second sorting configuration.

FIG. 9 is a side view of the latch mechanism of the waste sorting assembly of the present invention in the latched position.

FIG. 10 is a side view of the latch mechanism of the waste sorting assembly of the present invention in the unlatched position.

Similar reference characters refer to similar parts throughout the several views of the drawings.

DETAILED DESCRIPTION OF THE PREFERRED EMBODIMENT

Figure 1:
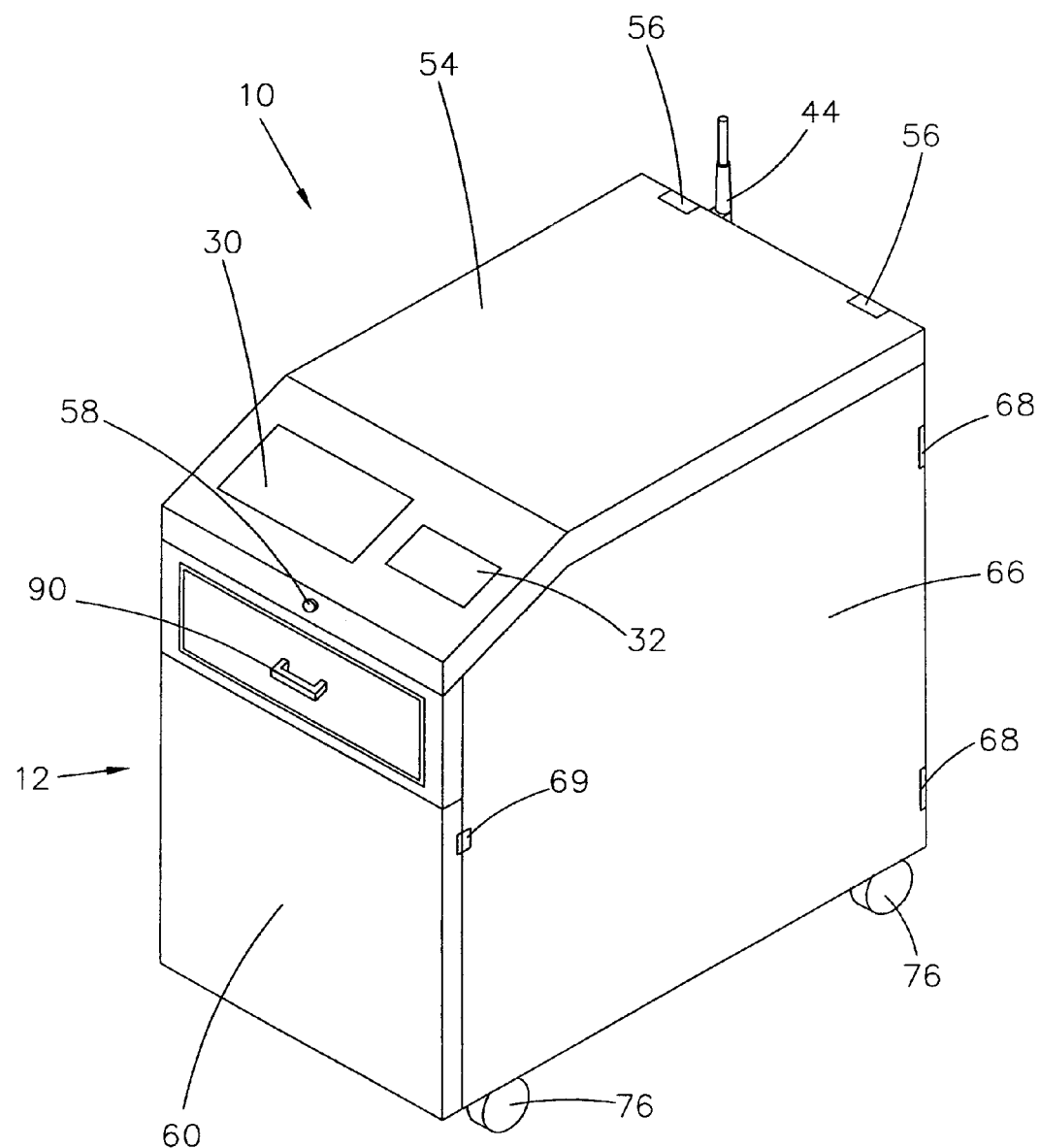
FIG. 1 is a perspective view of the waste collection system of the present invention.
Figure 2:
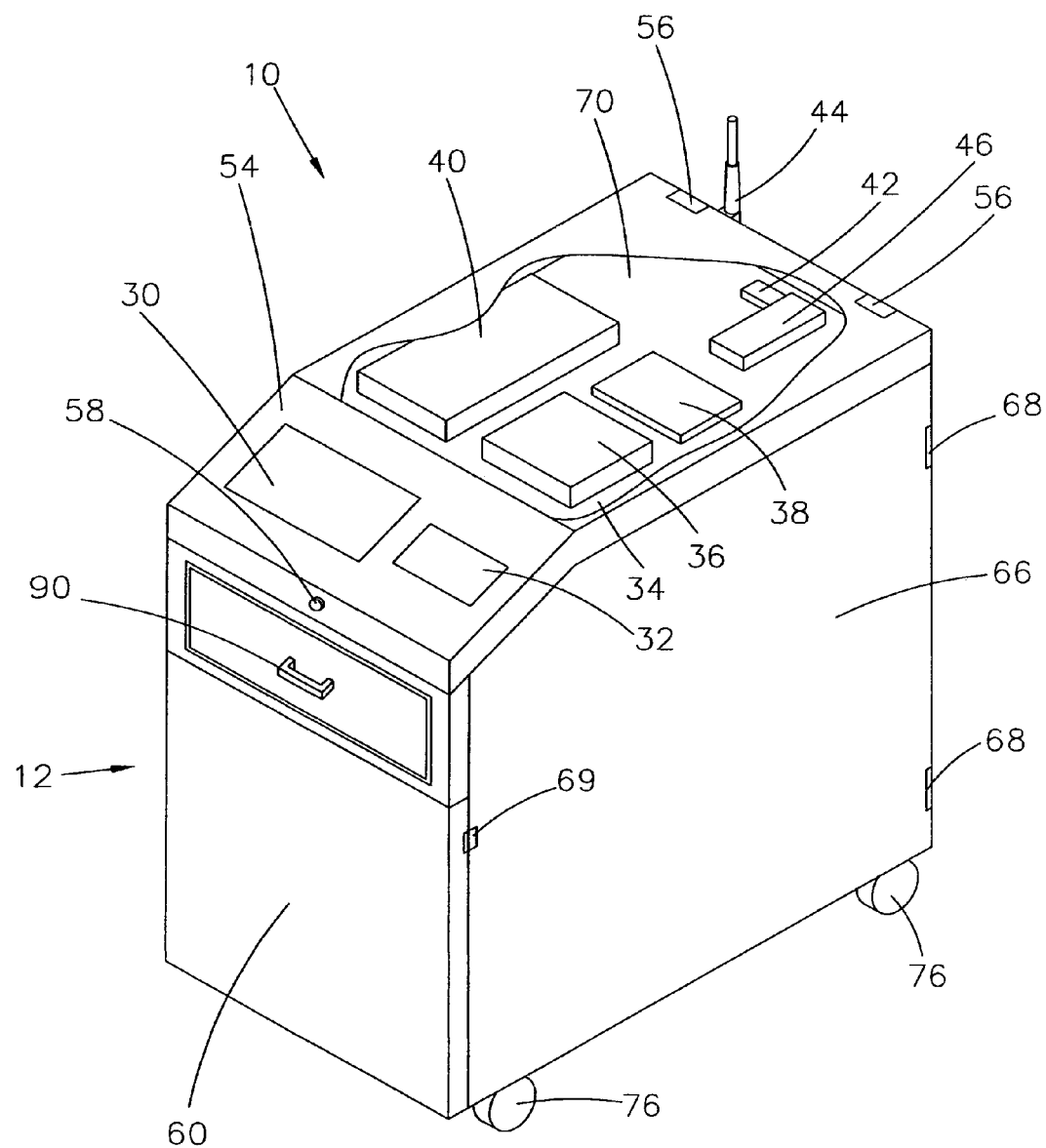
FIG. 2 is a partial cutaway perspective view of the waste collection system of the present invention.
Figure 3:
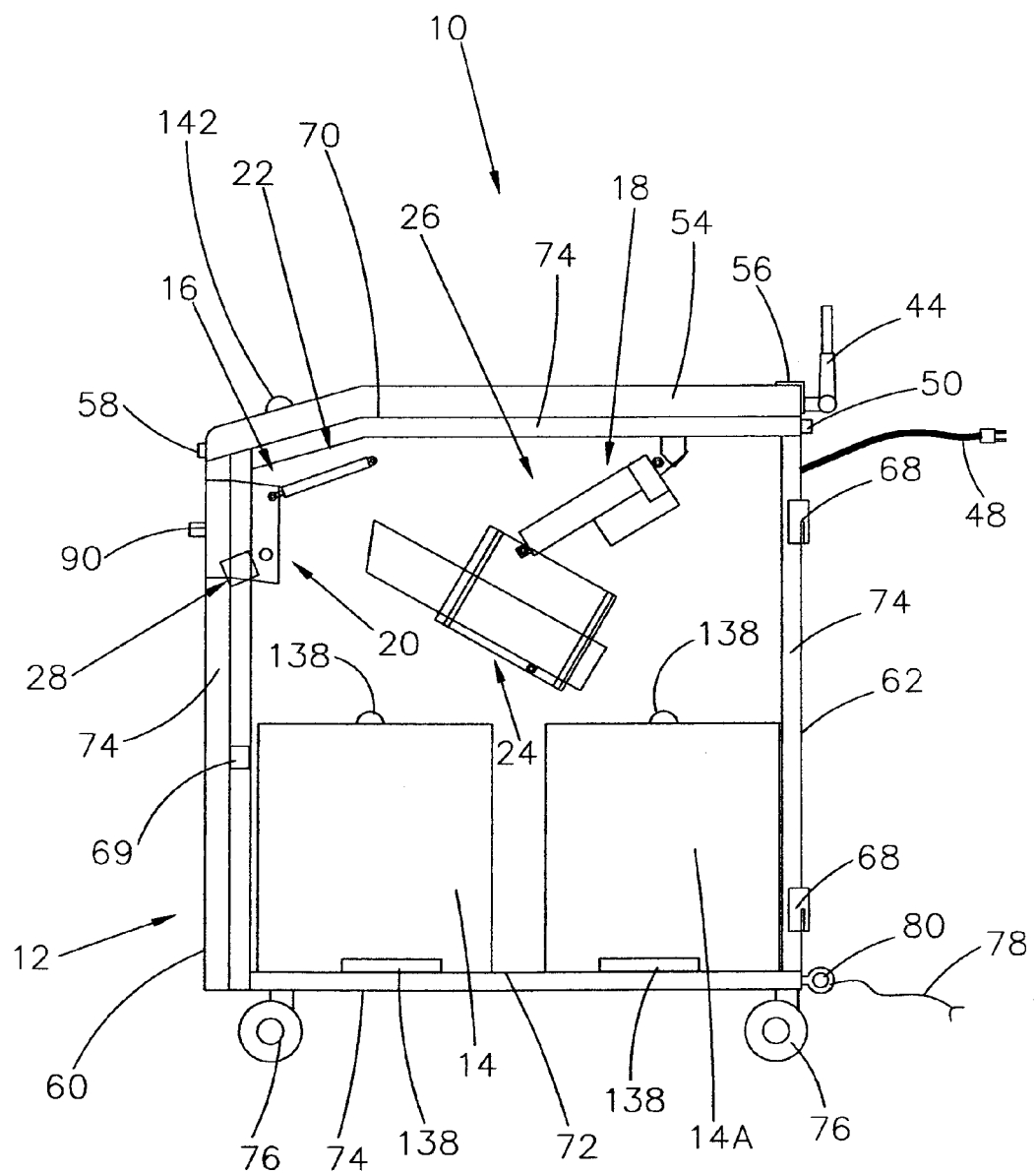
FIG. 3 is a cross-sectional side view of the waste collection system of the present invention.

As shown in FIGS. 1 through 3, the present invention relates to a waste collection system generally indicated as 10 to identify and classify waste material into a plurality of pre-established categories and then to sort into and collect the waste materials by the pre-established categories for subsequent disposal. When used to sort and collect medical waste materials the pre-established categories may comprise material returnable for credit, nonhazardous controlled material, nonhazardous noncontrolled material and hazardous material. Unidentified waste material or unclassified waste material may be defaulted as hazardous material.

As shown in FIG. 3, the waste collection system 10 is a smart cabinet generally indicated as 12 to house a plurality of collection bins or containers each indicated as 14 corresponding to the plurality of pre-established categories of waste materials and a waste sorting assembly including a first waste sorting subassembly and a second waste sorting subassembly generally indicated as 16 and 18 respectively.

As shown in FIGS. 3 through 8, the first waste sorting subassembly 16 comprises a first directional chute generally indicated as 20 movable between a first position and a second position by a first chute positioning device generally indicated as 22; while, the second waste sorting subassembly 18 comprises a second directional chute generally indicated as 24 movable between a first position and second position by a second chute positioning device generally indicated as 26. The first waste sorting subassembly 16 further includes a latch mechanism generally indicated as 28 to selectively secure the first directional chute 20 of the first waste sorting subassembly 16 in the first position.

Figure 11:
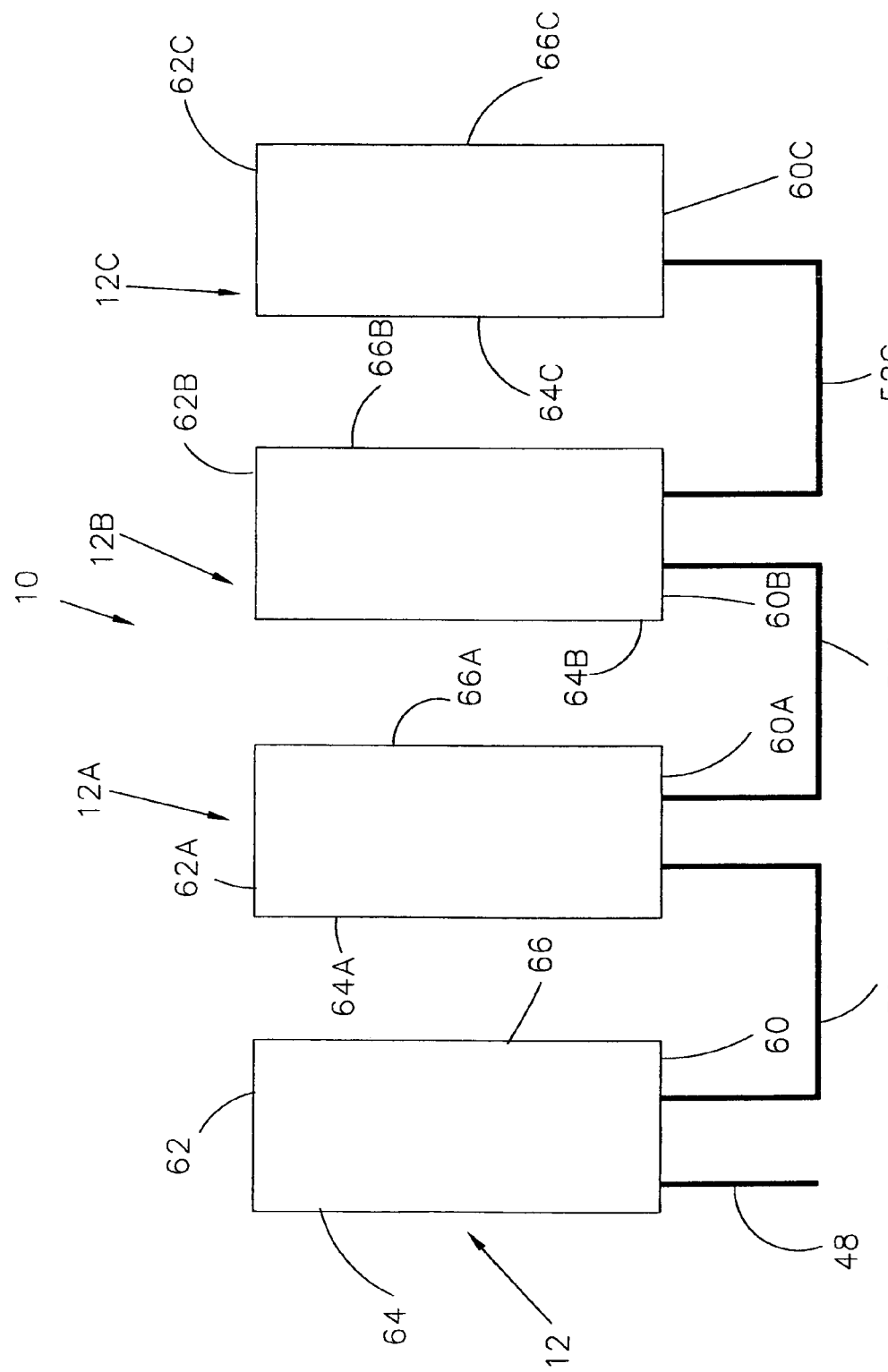
FIG. 11 is a top view of an alternate embodiment of the waste collection system of the present invention with multiple cabinets.

As shown in FIGS. 1 and 2, operation of the waste sorting assembly is controlled by a system control located in the upper portion of the cabinet 12 comprising a scanner reader (not shown) aligned with a scanner window 30 and a data input device (not shown) aligned with a touch screen, key pad or similar input device 32 together with a hard drive, a microprocessor/computer board, an input/output board, a printed circuit board, a wifi circuit with antenna and a USB hub indicated as 34, 36, 38, 40, 42, 44 and 46 respectively. The system control is coupled to an external power supply by a power cable 48 and to a series or plurality of cabinets 12A, 12B and 12C by a cable connector 50 and corresponding cables 52A, 52B and 52C that together comprise an alternate embodiment of the waste collection system (FIG. 11).

A cover 54 hingedly attached to the rear portion of the cabinet 12 by at least one hinge 56 provides access to the components of the system control for maintenance, repair or replacement. The cover 54 may be locked to the cabinet frame by a standard or state of the art cover lock mechanism 58.

In addition to the cover 54 which includes a substantially flat rear portion and a diagonally disposed front portion, the cabinet 12 comprises a front panel and a rear panel indicated as 60 and 62 respectively, a side panel 64, an access door panel 66 hingedly attached to the cabinet frame by a pair of hinges each indicated as 68. The access door panel 66 may be secured or locked by a standard or state of the art access door panel lock mechanism 69.

As shown in FIGS. 2 and 3, the system control components and the collection bins or containers 14 and 14A are supported by an upper support panel 70 and a lower support panel 72 respectively.

Each of the panels 60, 62, 64, 66, 70 and 72 is supported on or attached to a cabinet frame comprising a plurality of cabinet frame members each indicated as 74.

As shown in FIGS. 1 through 3, the cabinet 12 may be supported by a plurality of wheels or casters each indicated as 76 set inwardly from the lower periphery of the cabinet 12. In addition, the cabinet 12 may be tethered by a cable 78 coupled between a wall or similar structure (not shown) and the cabinet 12 by an anchor 80 secured to the cabinet 12 as shown in FIG. 3.

As described hereinafter, an access opening 82 is formed in the upper portion of the front panel 60 of the cabinet 12 to allow the waste material to be placed into the cabinet 12.

As shown in FIGS. 4 through 8, the first directional chute 20 of the first sorting subassembly 16 comprises a substantially flat trough-like chute panel 84 that when in the first position covers the access opening 82 above or in the flat wall panel 60 of the cabinet 12 and a pair of side panels each indicated as 86 rotatably coupled to or mounted on the cabinet 12 by a cross-bar 88 extending between the opposite sides of the cabinet 12. Of course, the first directional chute 20 may be rotatably coupled to each side of the cabinet 12 by a separate or corresponding pin or member (not shown). A handle 90 may be attached or mounted on the outer face of the substantially flat trough-like chute panel 84.

As shown in FIGS. 4 through 8, the first chute positioning device 22 comprises a first positioning element and a second positioning element operatively coupled and selectively movable relative to each other coupled to the cabinet 12 and the first directional chute 20 respectively. The first chute positioning device 22 may comprise a gas spring generally indicated as 92 to pivot the first directional chute 20 from the first position (FIG. 4) to the second position (FIGS. 6 and 7) to expose or open the access opening 82 of the cabinet 12 to allow access to the interior thereof when the latch mechanism 28 is moved from the latched position (FIG. 9) to the unlatched position (FIG. 10).

The gas spring 92 comprises a gas cylinder 94 coupled to the cabinet 12 by a coupling pin or member 96 and a piston/rod combination 98 reciprocally disposed within the gas cylinder 94 coupled to the upper rear portion 100 of one of the side panels 84 by a coupling pin or member 102 to pivot the first directional chute 20 to the second position when the latch mechanism 28 is unlatched. Specifically, the piston/rod combination 98 will extend under the pressure of the gas within the gas cylinder 94 when the latch mechanism 28 is unlatched and retract when an operator pushes or closes the first directional chute 20 against the gas pressure within the gas cylinder 94 to relatch the first direction chute 20 in the first position to cover or close the access opening 82.

As shown in FIGS. 9 and 10, the latch mechanism 28 comprises an electronic rotary latch including a latch housing or enclosure 104 mounted to a cabinet frame member 74 of the cabinet 12 by a pair of fasteners each indicated as 105 to house a micro-switch, spring and electronics to selectively rotate or open the latch member 106 from a first or latched position (FIG. 9) to a second or unlatched position (FIG. 10) having a slot 108 formed therein relative to a recess 110 formed in the latch housing or enclosure 104 mounted to the cabinet 12 and a striker bolt 112 mounted on one side of the first directional chute 20. The latch housing or enclosure 104 is offset relative to the cabinet 12 such that a line A-A bisecting the recess 110 is inclined from about 30 degrees to about 40 degrees and preferably about 35 degrees from the horizontal to properly align the striker bolt 112 relative to the slot 108 and the recess 110 when the latch member 106 moves between the latched and unlatched position. An example of a suitable latch mechanism 28 is Southco R4 EM electric rotary latch.

Figure 4:
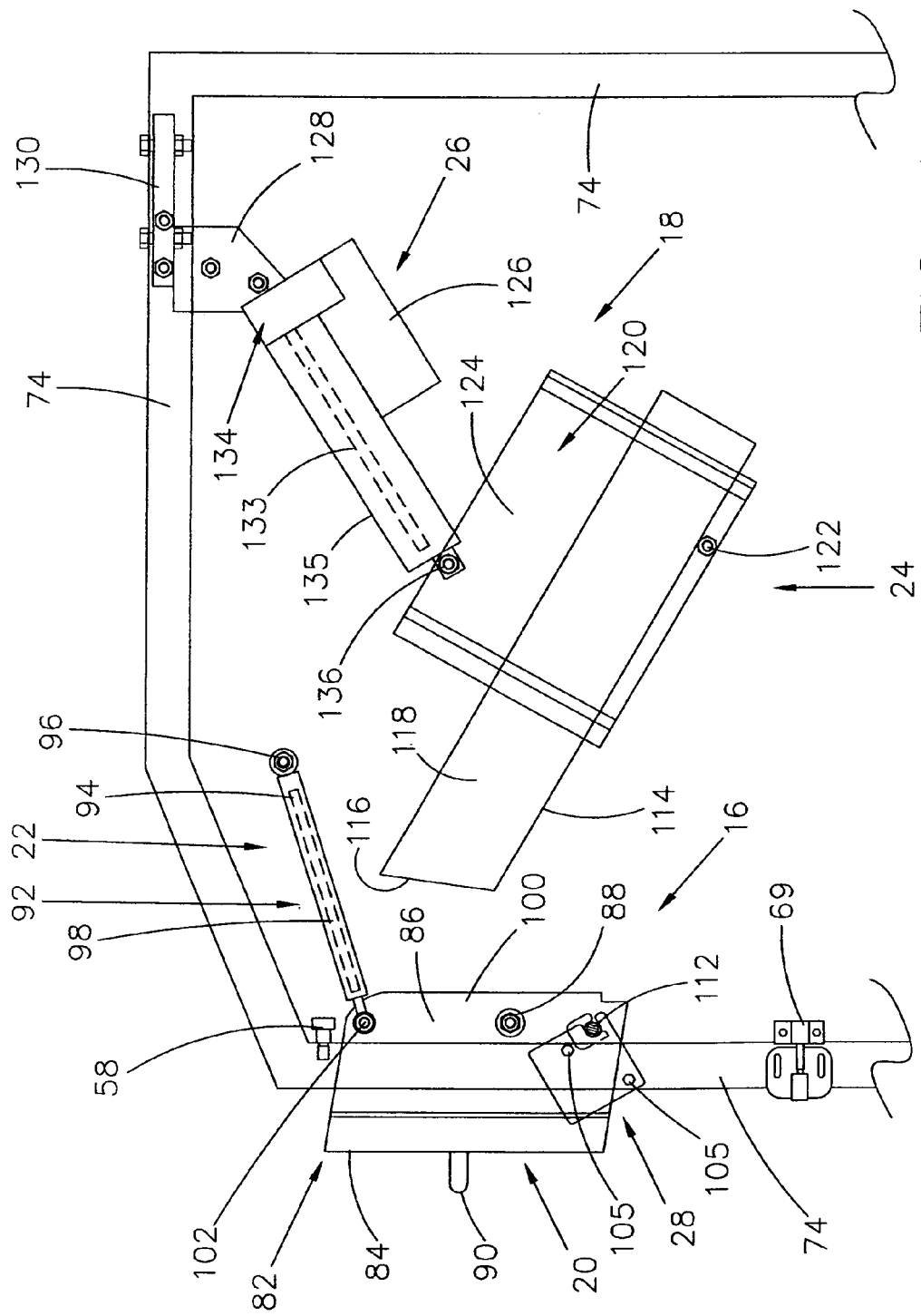
FIG. 4 is a side view of the waste sorting assembly of the waste collection system of the present invention.
Figure 5:
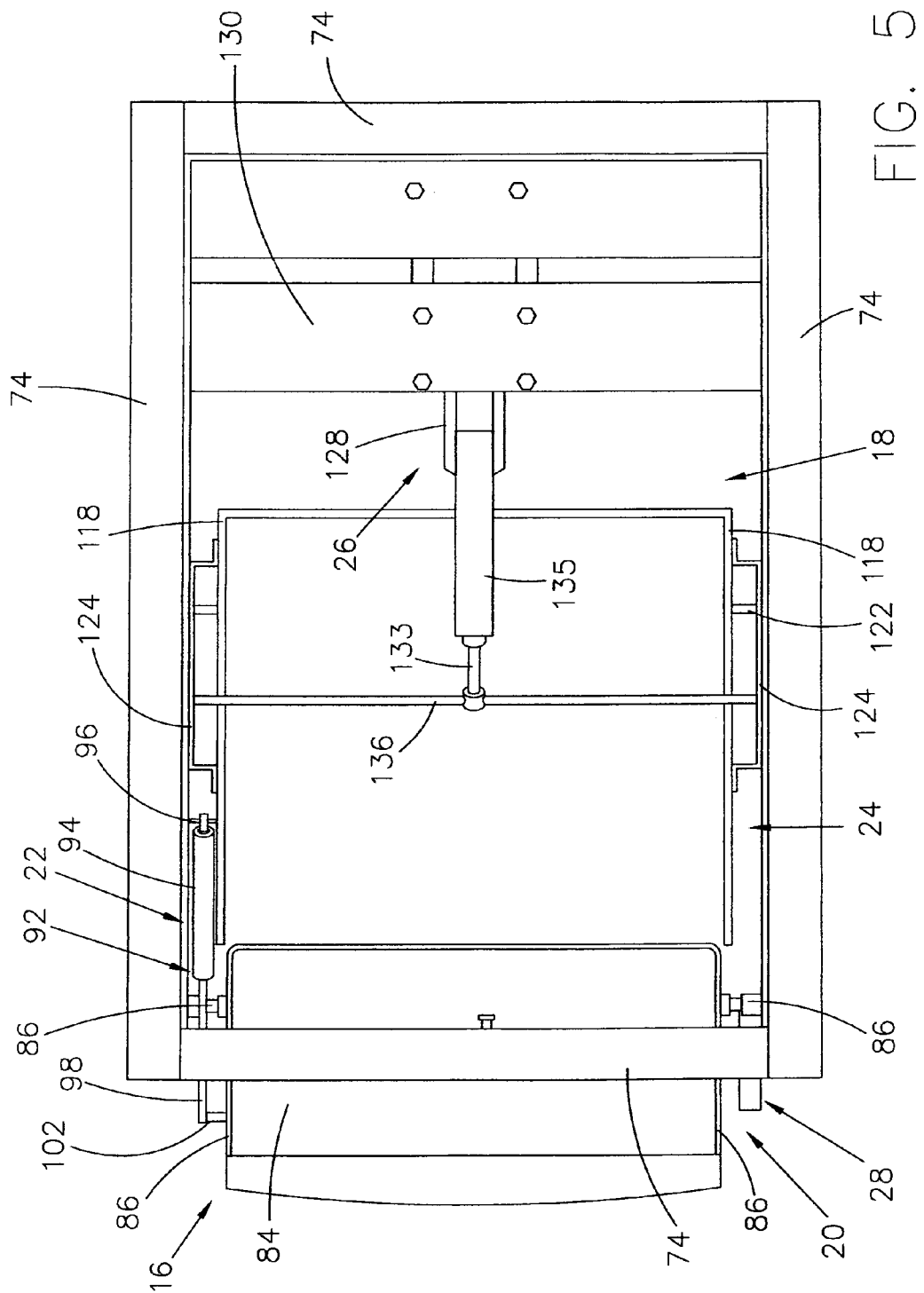
FIG. 5 is a cross-sectional top view of the waste sorting assembly of the waste collection system of the present invention.

As shown in FIGS. 3 through 4, the second directional chute 24 comprises a substantially flat chute panel 114, a diagonally inclined or disposed front chute panel 116 forming an angle of greater than 90° extending forwardly from the front portion of the substantially flat chute panel 114, a pair of chute side walls 118 extending upwardly from the substantially flat chute panel 114 and an open rear portion 120 rotatably coupled to the opposite sides of the cabinet 12 by a cross-member or mounting rod 122 extending through a support side panel 124 affixed to a corresponding chute side wall 118.

As shown in FIGS. 4 through 8, the second chute positioning device 26 comprises a first positioning element and a second positioning element operatively coupled and selectively movable relative to each other coupled to the cabinet 12 and the second directional chute 24 respectively. The second chute positioning device 28 may comprise an actuator including a first positioning member or element such as a motor 126 mounted to opposite sides of the cabinet 12 by a mounted bracket 128 and a mounting cross member 130 operatively coupled to a second positioning member or element such as a worm gear or screw 133 disposed within a housing 135 by a gear or gears generally indicated as 134 by a cross member rod 136 coupled to opposite sides of the second directional control chute 24 by the support side panels 124. An M-Track Acme screw actuator is an example of such a positioning device. Alternatively, the second chute positioning device 26 may comprise a hydraulic or pneumatic cylinder/piston combination or assembly.

The unlatching of the latch mechanism 28 and the operation of the second chute positioning device 24 are controlled by the system control as described hereinafter.

As shown in FIG. 3, a sensor 138 such as an electric eye or similar device or a scale 140 corresponding to each collection bin or container 14 and 14A may generate a signal fed to the system control to energize an audible or visual indicator 142 on the diagonally disposed front portion 62 of the cover 54 when the corresponding collection bin container 14 or 14A is at or approaching capacity and should be replaced or emptied. Of course, a separate audible or visual indicator 142 may be provided for each individual collection bin or container 14 and 14A.

To implement the setup and operation of the waste collection system 10, items of waste materials WM are grouped into predefined categories comprising the plurality of the pre-established categories such as nonhazardous noncontrolled material, hazardous material, non-hazardous controlled material and material returnable to a supplier or vendor for credit. Once the categories are defined, the specific items of waste materials WM to be sorted and collected in the collection bins or cans 14 or 14A are assigned to one of the plurality of pre-established categories. The specific items of waste materials WM and the corresponding pre-established category are entered into a look-up table or data base within the system control or a remote look-up table or remote data base hard wired to the system control or coupled through the wifi 44.

Described generally, the sequence of operation of the waste collection system comprises the following steps.
  identify employee or operator (RFID, magnetic card);
  scan item (bar code or other discrete item identifiers);
  search item in look-up table or data base;
  if item is not identified, a series of prompts such as product name or patient name may assist in identifying the item;
  item identified;
  item sorted into designated collection bin or container;
  if item is not be identified, item is assigned to a default category and sorted into designated collection bin or container;
  a web based program may be used to identify, track and report items' collected.

Figure 12:
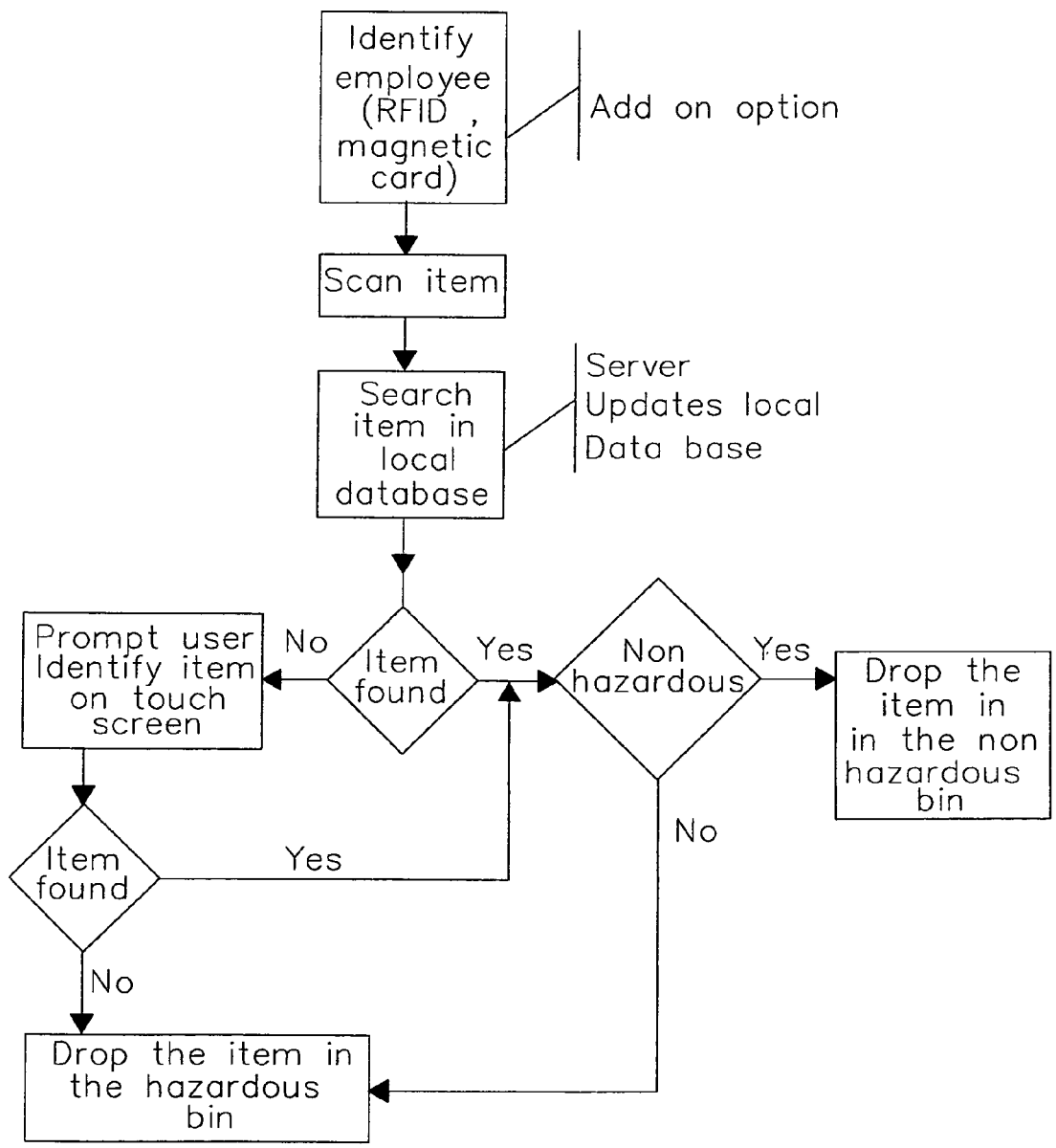
FIG. 12 is a flow chart of the sequential operation of the process of identifying, classifying, sorting and collecting of the waste material of the waste collection system of the present invention with a single smart cabinet.

More particularly, the process of identifying and classifying, sorting and collecting items of waste materials WM into two categories for subsequent disposal is illustrated in FIG. 12 depicting a first or initial routine to identify the item of waste material WM to be sorted and a second or final routine to direct or channel the items of waste material WM into the correct collection bin or container 14 or 14A designated for the particular category of waste material WM such as nonhazardous or hazardous for temporary storage and subsequent off site disposal.

Referring to FIG. 12, the employee's identification card or the like may be read through the scanner window 30 by the reader or scanner (not shown) and compared to a list of employees. Then, when sorting and collecting the items of waste material WM into two (2) pre-established categories such as nonhazardous or hazardous, the bar code or other discrete identifier of the items of waste material WM to be placed in the waste collection cabinet 12 is scanned through the scanner window 30 by the reader or scanner (not shown) and compared with the list of items of waste material WM stored in the look-up table or data base (not shown) to determine whether or not the scanned item of waste material WM is classified. The item of waste material WM is either identified or not identified. If the item of waste material WM is identified by the look-up table or data base, the item of waste material WM is classified as either nonhazardous or hazardous and deposited in the appropriate collection bin or container 14 or 14A. If the item of waste material WM is not identified from the look-up table or data base, the employee or operator may enter the patient's name or information from the item of waste material WM or container in which the item of waste material WM is contained into the system control through the use of the data input device (not shown) through the touch screen, key pad or similar input device 32. If the item of waste material WM is identified by the look-up table or data base, the item of waste material WM is classified as either nonhazardous or hazardous and deposited in the appropriate collection bin or container 14 or 14A. If the item of waste material WM is not identified, the items of waste material WM is deposited in the collection bin or container 14 or 14A designated for hazardous items of waste material WM.

Once the first stage or phase of identifying and classifying each item of waste material WM is complete, the second stage or phase of sorting and collecting the items of waste material WM into the appropriate collection bin or container 14 or 14A is preferred.

Figure 6:
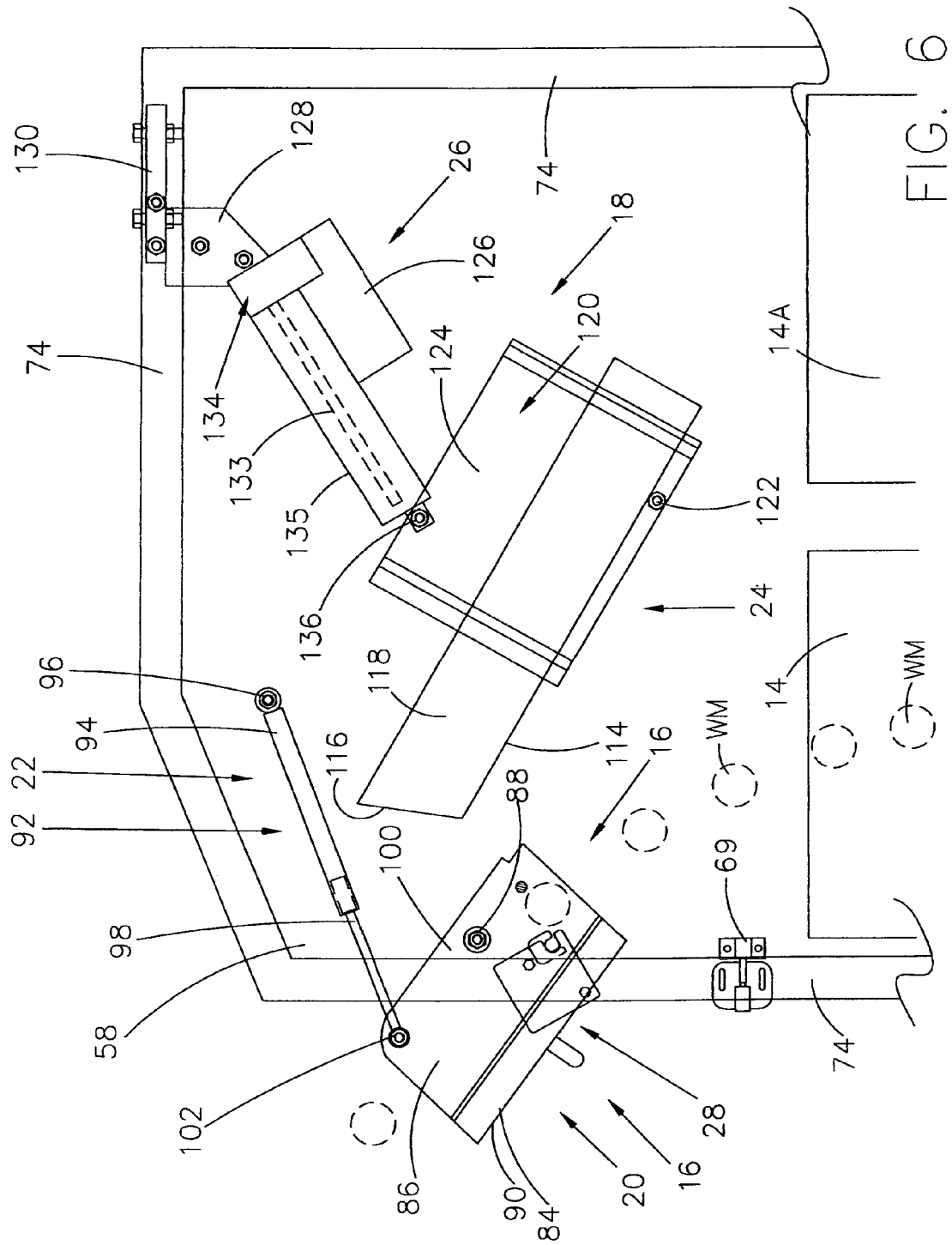
FIG. 6 is a side view of the waste sorting assembly of the waste collection system of the present invention in the first sorting configuration.

In particular, if the item of waste material WM is classified as nonhazardous, a first actuator signal is fed to release the latch mechanism 28 allowing the first chute positioning device 22 to move from the first or retracted position to the second or extended position to pivot the first directional chute 20 from the first position to the second position to direct the item of waste material WM to the collection bin or container 14 (FIG. 6). Once the item of waste material WM is directed to the collection bin or container 14, the operator returns the first directional chute 20 to the first or retracted position by pivoting the first directional chute 20 from the second position to the first position against the force or bias of the first chute position device 22 returning the piston/rod combination 98 of the second positioning element from the extended to the retracted position such that the striker bolt 112 re-engages and rotates the latch member 106 to the first or latched position to latch the first directional chute 20 in the first position for subsequent operation.

If the scanned item of waste material WM is classified as hazardous, then a second actuator signal is generated by the system control to actuate the second chute positioning device 26 to move the second positioning element 133 from the first or retracted position to the second or extended position to pivot or rotate the second directional chute 24 from the first position to the second position then the a first actuator signal is fed to release the latch mechanism 28 allowing the first chute positioning device 22 to move from the first or retracted position to the second or extended position to pivot the first directional chute 20 from the first position to the second position such that a hazardous item WM placed into the first directional chute 20 will be directed into the second directional chute 24 (FIG. 7).

Once the hazardous item of waste material WM is directed to the second directional chute 24, the operator returns the first directional chute 20 to the first or retracted position by pivoting the first directional chute 20 from the second position to the first position against the force or bias of the first chute position device 22 returning the piston/rod combination 98 of the second positioning element from the extended to the retracted position such that the striker bolt 112 re-engages and rotates the latch member 106 to the first or latched position to latch the first directional chute 20 in the first position.

Once the first directional chute 20 is returned or pivoted to the first position and the latch member 106 of latch mechanism 28 is returned to the first or latched position, the system control generates a third actuator signal to actuate the second chute positioning device 26 to move the second positioning element 133 of the second chute positioning device 26 from the second extended position to the first retracted position to pivot rotate the second directional chute 24 from the second position to the first position depositing the hazardous item of waste material WM into the collection bin or container 14A (FIG. 8).

With both the first directional chute 20 and second directional chute 24 in the first position, the waste collection system 10 is configured for an additional cycle of identifying, classifying, sorting and collecting.

Figure 13:
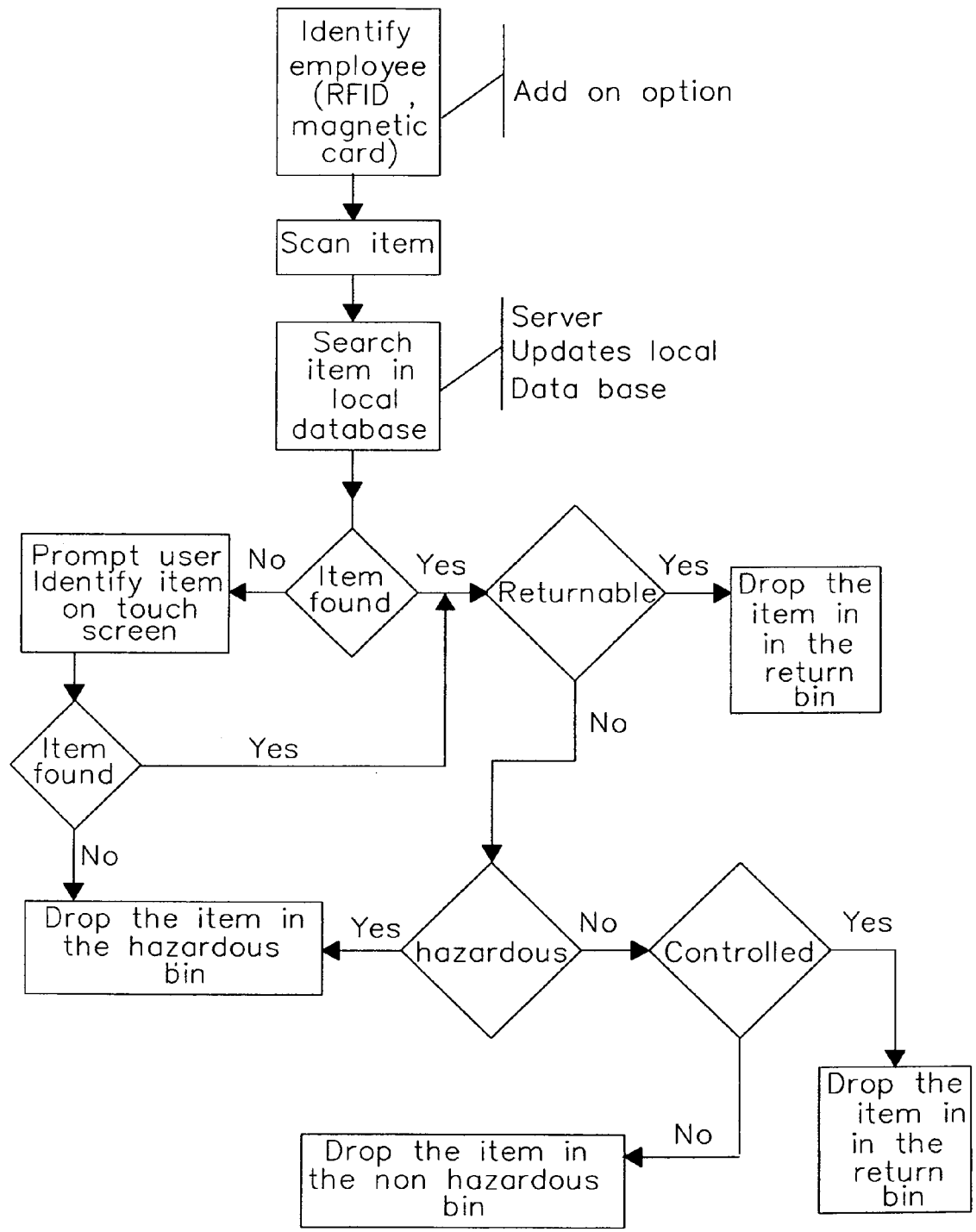
FIG. 13 is a flow chart of the sequential operation of the process of identifying, classifying, sorting and collecting of waste materials of the waste collection system of the present invention with multiple cabinets.

As shown in FIGS. 11 and 13, the waste collection system of the present invention may comprise a plurality of cabinets 12, 12A, 12B and 12C. So configured, the waste collection system is capable of sorting and collecting more than two (2) categories of waste material WM such as material returnable for credit, nonhazardous controlled material, nonhazardous noncontrolled material and hazardous material.

In addition, when a collection bin or container 14/14A is full an electronic message' is sent to notify that the collection bin or container 14/14A needs to be replaced or items of waste material WM may be directed to a second collection bin or container 14/14A by a fourth actuator signal.

Further, each collection bin or container 14/14A has a unique bar code that identifies container and contents of each container:
  each collection bin or container 14/14A is tracked through common carrier until disposal; and
  control drugs to be tracked and disposed and provide accountability and a system to "Close The Loop" from dispensing to disposal.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described

What is claimed is:

1. A waste collection system to identify and classify waste materials into a plurality of pre-established categories and to sort into and collect the waste materials by the plurality of the pre-established categories for subsequent disposal, said waste collection system comprising a cabinet including an access opening to house a plurality of collection bins or containers corresponding to said plurality of pre-established categories of waste materials to receive and collect the waste materials by the corresponding pre-established category, a waste sorting assembly to selectively direct the waste materials into said collection bin or container corresponding to the particular category of waste material, and a system control to identify and classify waste materials into one of the plurality of pre-established categories and to direct the categorized waste material into said corresponding collection bin or container for subsequent disposal, said waste sorting assembly comprising a first waste sorting subassembly to direct categorized waste material to a first collection bin or container and a second waste sorting subassembly to direct categorized waste material to a second collection bin or container, said first waste sorting subassembly comprising a first directional chute movable between a first position and a second position by a first chute positioning device and said second waste sorting subassembly comprises a second directional chute movable between a first position and second position by a second chute positioning device, said first directional chute of said first sorting subassembly comprising a trough-like chute panel that when in said first position to cover said access opening rotatably coupled to said cabinet and said second directional chute of said second sorting subassembly comprises a substantially flat chute panel including a front portion, a diagonally inclined or disposed front chute panel forming an angle of greater than 90° extending forwardly from said front portion of said substantially flat chute panel, a pair of chute side walls extending upwardly from said substantially flat chute panel and an open rear portion rotatably coupled to opposite sides of said cabinet.

2. The waste collection system of claim 1 wherein said first chute positioning device comprises a first positioning element and a second positioning element operatively coupled and selectively movable relative to each other coupled to said cabinet and said first directional chute and said second chute positioning device comprises a first positioning element and a second positioning element operatively coupled and selectively movable relative to each other coupled to said cabinet and the second directional chute respectively.

3. The waste collection system of claim 2 wherein said first chute positioning device comprises a gas spring to pivot said first directional chute from said first position to said second position to open said access opening of said cabinet to allow access to the interior thereof and said second chute positioning device comprises an actuator including a first positioning member or element mounted to opposite sides of said cabinet by a mounted bracket and a mounting cross member coupled to a second positioning member or element by a cross member coupled to opposite sides of said second directional control chute.

4. The waste collection system of claim 3 wherein said second positioning member or element comprises a worm gear coupled by a gear.

5. The waste collection system of claim 1 wherein categorized waste material is deposited in a first collection bin or container when said second directional chute is moved forward in said first position to said second position and said second collection bin or container is in said second position.

6. The waste collection system of claim 5 wherein categorized waste material is deposited in said second directional chute when said first directional chute and said second directional chute are in said second position.

7. The waste collection system of claim 6 wherein categorized waste material is deposited from said second directional chute to a second collection bin or container when said second directional chute is moved from said second position to said first position.

8. A waste collection system to identify and classify waste materials into a plurality of pre-established categories and to sort into and collect the waste materials by the plurality of the pre-established categories for subsequent disposal, said waste collection system comprising a cabinet including an access opening to house a plurality of collection bins or containers corresponding to said plurality of pre-established categories of waste materials to receive and collect the waste materials by the corresponding pre-established category, a waste sorting assembly to selectively direct the waste materials into said collection bin or container corresponding to the particular category of waste material, and a system control to identify and classify waste materials into one of the plurality of pre-established categories and to direct the categorized waste material into said corresponding collection bin or container for subsequent disposal, said waste sorting assembly comprising a first waste sorting subassembly to direct categorized waste material to a first collection bin or container and a second waste sorting subassembly to direct categorized waste material to a second collection bin or container, said first waste sorting subassembly comprising a first directional chute movable between a first position and a second position by a first chute positioning device, said first waste sorting subassembly further including a latch mechanism to selectively secure said first directional chute of said first waste sorting subassembly in said first position.

9. The waste collection system of claim 8 wherein said the latch mechanism comprises a rotary latch including a latch housing or enclosure mounted to said cabinet to house a micro-switch and spring to selectively rotate or open said latch member from a first or latched position to a second or unlatched position having a slot formed therein relative to a recess formed in said latch housing or enclosure mounted to said cabinet and a striker bolt mounted on one side of said first directional chute.

10. The waste collection system of claim 9 wherein said latch housing or enclosure is offset relative to said cabinet to bisect said recess inclined relative from about 30 degrees to about 40 degrees and preferably about 35 degrees from the horizontal to properly align said striker bolt relative to said slot and said recess when said latch member moves between said latched position and unlatched position.

11. The waste collection system of claim 10 wherein said recess is inclined from about 30 degrees to about 40 degrees.

12. The waste collection system of claim 10 wherein said recess is inclined at about 35 degrees.

13. A waste collection system to identify and classify waste materials into a plurality of pre-established categories and to sort into and collect the waste materials by the plurality of the pre-established categories for subsequent disposal, said waste collection system comprising a cabinet including an upper portion and an access opening to house a plurality of collection bins or containers corresponding to said plurality of pre-established categories of waste materials to receive and collect the waste materials by the corresponding pre-established category, a waste sorting assembly to selectively direct the waste materials into said collection bin or container corresponding to the particular category of waste material, and a system control to identify and classify waste materials into one of the plurality of pre-established categories and to direct the categorized waste material into said corresponding collection bin or container for subsequent disposal, said system control comprising a scanner reader aligned with a scanner window and a data input device aligned with an input device together with a hard drive, a microprocessor/computer board, an input/output board, a printed circuit board, a wifi circuit with antenna and a USB hub located in the upper portion of said cabinet.

\* \* \* \* \*